(12) United States Patent
Bergemann et al.

(10) Patent No.: US 9,764,278 B2
(45) Date of Patent: Sep. 19, 2017

(54) COMPRESSED AIR SUPPLY UNIT, COMPRESSED AIR SUPPLY SYSTEM, AND VEHICLE, IN PARTICULAR PASSENGER CAR, HAVING A COMPRESSED AIR SUPPLY UNIT

(71) Applicant: WABCO GmbH, Hannover (DE)

(72) Inventors: Klaus-Dieter Bergemann, Hannover (DE); Klaus Bredbeck, Landesbergen (DE); Dieter Frank, Hannover (DE); Morten Gehrke, Wennigsen (DE); Frank Meissner, Hannover (DE); Uwe Stabenow, Laatzen (DE)

(73) Assignee: WABCO GMBH, Hannover (DE)

( * ) Notice: Subject to any disclaimer, the term of this patent is extended or adjusted under 35 U.S.C. 154(b) by 384 days.

(21) Appl. No.: 14/367,303

(22) PCT Filed: Nov. 28, 2012

(86) PCT No.: PCT/EP2012/004890
§ 371 (c)(1),
(2) Date: Jun. 20, 2014

(87) PCT Pub. No.: WO2013/091764
PCT Pub. Date: Jun. 27, 2013

(65) Prior Publication Data
US 2014/0373718 A1     Dec. 25, 2014

(30) Foreign Application Priority Data

Dec. 23, 2011  (DE) .......................... 10 2011 122 289
Mar. 19, 2012  (DE) .......................... 10 2012 005 308

(51) Int. Cl.
*B01D 53/02*     (2006.01)
*B01D 53/26*     (2006.01)
(Continued)

(52) U.S. Cl.
CPC ....... *B01D 53/261* (2013.01); *B01D 53/0407* (2013.01); *B60G 17/0408* (2013.01);
(Continued)

(58) Field of Classification Search
CPC .......... B01D 2259/41; B01D 2259/455; B01D 53/0407; B01D 53/261; B60G 17/0408;
(Continued)

(56) References Cited

U.S. PATENT DOCUMENTS 3,324,631 A      6/1967  Kreuter
4,398,929 A  *   8/1983  Segersten ............ B01D 53/261
                                                137/113
(Continued)

FOREIGN PATENT DOCUMENTS

DE         697 22 636       7/2003
DE    10 2006 037 307       2/2008
(Continued)

*Primary Examiner* — Christopher P Jones
(74) *Attorney, Agent, or Firm* — Leydig, Voit &/ Mayer, Ltd.

(57) ABSTRACT

A compressed air supply unit for operating a pneumatic unit by means of a compressed air flow, in particular of an air suspension unit of a vehicle, comprises an air dryer arrangement in a main pneumatic line that pneumatically links a compressed air feed line from an air compressor and a compressed air connection to the pneumatic unit. A valve arrangement is pneumatically connected to the main pneumatic line for controlling the compressed air flow. The air dryer arrangement has a drying container having a container outer wall. A partition along a length of the drying container divides an internal space delimited by the container outer wall into first and second chambers delimited by the partition and the container outer wall. The partition adjoins the
(Continued)

container outer wall along the length of the drying container, and the first and second chambers are adjacent to one another along that length.

22 Claims, 5 Drawing Sheets

(51) Int. Cl.
  *B01D 53/04* (2006.01)
  *F15B 21/04* (2006.01)
  *B60G 17/04* (2006.01)

(52) U.S. Cl.
  CPC ........ *F15B 21/048* (2013.01); *B01D 2259/41* (2013.01); *B01D 2259/455* (2013.01); *B60G 2500/204* (2013.01); *B60G 2600/66* (2013.01)

(58) Field of Classification Search
  CPC .......... B60G 2500/204; B60G 2600/66; F15B 21/048
  See application file for complete search history.

(56) References Cited

U.S. PATENT DOCUMENTS

| | | | | |
|---|---|---|---|---|
| 4,764,189 | A | * | 8/1988 | Yanagawa ............ B60T 17/004 95/15 |
| 4,846,211 | A | * | 7/1989 | Scheffler .............. B01D 53/261 137/119.01 |
| 5,901,464 | A | * | 5/1999 | Kazakis ................. B01D 45/16 34/562 |
| 6,000,432 | A | | 12/1999 | Trapp et al. |
| 6,203,601 | B1 | | 3/2001 | Trapp et al. |
| 2009/0199523 | A1 | * | 8/2009 | Hilberer ................ B60T 17/004 55/385.3 |
| 2014/0144326 | A1 | * | 5/2014 | Minato ............. B01D 53/0407 96/108 |

FOREIGN PATENT DOCUMENTS

| | | |
|---|---|---|
| DE | 10 2010 031 306 | 1/2012 |
| EP | 1 048 540 A1 | 11/2000 |
| EP | 1 233 183 | 8/2002 |
| JP | 5878133 U | 5/1983 |
| WO | WO 99/37387 | 7/1999 |
| WO | WO 2005/051521 | 6/2005 |
| WO | WO 2009/043427 A1 | 4/2009 |

* cited by examiner

COMPRESSED AIR SUPPLY UNIT, COMPRESSED AIR SUPPLY SYSTEM, AND VEHICLE, IN PARTICULAR PASSENGER CAR, HAVING A COMPRESSED AIR SUPPLY UNIT

FIELD OF THE INVENTION

The present invention generally relates to a compressed air supply unit and system.

BACKGROUND OF THE INVENTION

Compressed air supply units are used in vehicles of all kinds, especially for supplying air suspension units of passenger cars with compressed air. Air suspension units can also comprise level control devices, by means of which the clearance between the vehicle axle and the vehicle body can be adjusted. An air suspension system of a pneumatic compressed air supply system comprises a number of air bellows that are pneumatically connected to a common line (gallery), which can raise the vehicle body as they are filled to an increasing extent and can lower it when they are filled to a decreasing extent. Such a system has application in all-terrain vehicles (ATVs) and sports utility vehicles (SUVs). A compressed air supply unit for use in a pneumatic compressed air supply system having a pneumatic unit, e.g., having an air suspension unit as described above, is operated with compressed air from a compressed air feed, e.g., within the range of a pressure level of 5 to 20 bar. The compressed air is made available to the compressed air feed by means of a compressor. On one hand, the compressed air feed is pneumatically linked to a compressed air connection in order to supply the pneumatic unit; on the other hand, the compressed air feed is pneumatically linked to a vent connection. By means of a vent valve arrangement, the compressed air supply unit and/or the pneumatic unit can be vented by releasing air toward the vent connection.

To ensure long-term operation of the compressor supply unit, the unit has an air dryer, by means of which the compressed air can be dried. Accumulation of moisture in the compressed air supply unit is thereby avoided, which can otherwise lead to valve-damaging crystal formation and other unwanted effects in the compressed air supply unit and in the pneumatic unit at relatively low temperatures. An air dryer has a drying agent, generally loose granules, through which the compressed air can flow, allowing the loose granules to take up moisture contained in the compressed air by adsorption at a relatively high pressure. One proven practice is to accommodate the drying granules in a separate replaceable dryer cartridge, which is inserted into a dryer housing. A dryer cartridge of this kind has a dryer bed for the U-shaped or alternately opposed routing of a compressed air flow in an arrangement of annular spaces through which there is to be flow. The dryer cartridge can be replaced easily. On the other hand, the routing of the compressed air flow in the annular spaces through which there is to be flow lengthens the dryer bed and thus improves the drying of the compressed air.

A dryer cartridge for a commercial vehicle, which is known from WO 2005/051521 A1, for example, typically has an outer annular space and an inner central space. A compressed air flow flows through the entire outer annular space of the dryer cartridge, is diverted to the central space in a dome above the annular space, and is routed in a countercurrent direction parallel to the outer annular space in the central space; the compressed air flow leaves the dryer cartridge on the same side as it flows in. DE 10 2006 037 307 A1 discloses a dryer cartridge, which provides meandering nesting of such annular spaces, wherein, following the same principle, there is parallel and countercurrent flow through the annular spaces by a compressed air flow; i.e., a drying container in the form of the dryer cartridge has an outer container outer wall and a number of annular walls along a longitudinal extent of the dryer cartridge, wherein the annular walls divide a dryer cartridge interior delimited by the container outer wall into a large number of annular spaces that are pneumatically linked and allow parallel and countercurrent through-flow.

An alternative embodiment of a replaceable dryer cartridge is known from EP 1 048 540 A1, wherein the dryer cartridge is formed with a container outer wall, the internal space of which is subdivided by a number of loosely inserted separate dividing plates extending over the cross section of the internal space into partitions that extend over the entire cross section of the internal space. The compressed air flow enters the dryer cartridge via a narrow outer annular space, is diverted in a dome thereof, and flows transversely through the partitions between the plates to a longitudinal extent of the dryer cartridge. A dryer cartridge of this kind causes a relatively high pressure loss in a compressed air flow.

EP 1 233 183 B1 describes a compressed air control device having an air dryer. A pot-shaped drying container is inserted in the air dryer housing. The interior of the container can be linked via the housing to a compressed air source, on the one hand, and to a pressure accumulator, on the other hand, by means of a valve arrangement. The valve arrangement provides a first, second and third controllable directional valve, wherein two of the valves are used to open a first and a second passage in the bottom of the drying container. Opposite the bottom of the drying container, the container is open, wherein the granules contained in the drying container are held by an end plate, which is centered on a central bar and secured thereon at the end by means of a spring clip. There can be flow in two directions, for emptying and filling the pressure accumulator, through the container internal space surrounding the bar. This construction is relatively complex and its functioning can be improved.

Improved air drying, in particular with an improved dryer bed, combined with a pressure loss that is still acceptable is desirable. Also, the improved air drying should be capable of being implemented in a space-saving manner, and should be suitable for use in a passenger car.

SUMMARY OF THE INVENTION

Generally speaking, it is an object of the present invention to provide an apparatus, in particular a compressed air supply unit, for operating a pneumatic unit by means of a compressed air flow to achieve improved air drying. In particular, an object of the present invention is to achieve the air drying with a relatively long dryer bed in combination with a pressure loss that is still acceptable. Moreover, it is an object of the present invention to provide a compact compressed air supply unit, preferably suitable for a passenger vehicle.

The fundamental approach to achieving a lengthened dryer bed by means of an arrangement of spaces through which there is to be flow can be used to increase the dryer performance of an air dryer arrangement. Nonetheless, the arrangement of spaces through which there is to be flow can still be improved, inter alia, to limit a pressure loss and to achieve a compact arrangement. It is considerably more advantageous for the design of an air dryer arrangement if a drying container of the air dryer arrangement is formed by means of a container outer wall and a partition along a longitudinal extent of the drying container, wherein the partition divides an internal space delimited by the container outer wall into a first and a second chamber, which are nevertheless linked by a pneumatic link. Improved air drying can be achieved because the partition adjoins the container outer wall along the longitudinal extent and subdivides the internal space of the drying container into a first chamber and a second chamber, which are arranged adjacent to one another, wherein the first and the second chamber are delimited by the partition and the container outer wall. This has the advantage of a relatively compact and robust construction combined with improved dryer performance.

A drying container with a dryer bed already improved to this extent can also be operated with an improved pressure loss limit and can be of more compact design. Because the first and second chambers are arranged adjacent to one another and both are delimited by the partition and the container outer wall, the drying container is also more compact and can be sealed off more reliably relative to an operating pressure and can be designed for a higher bursting pressure.

It will be appreciated that the compressed air supply unit according to embodiment of the present invention has application in the operation of the pneumatic unit, in particular an air suspension unit, by means of a compressed air flow in a passenger car, including, for example, in an SUV. The compact and pressure-resistant design of the drying container supports the rapid venting cycles that occur in this use and the high air consumption and accumulator operation.

It should be understood that the present invention is not restricted to a compressed air supply unit having a dryer arrangement, which has a drying container with just two chambers separated by a single partition, although this is particularly advantageous. On the contrary, the drying container can have more than two chambers and/or more than one partition. In one embodiment, for example, a first and a second partition along a longitudinal extent of the drying container divides an internal space delimited by the container outer wall into a first and a second and a third chamber. The first chamber and the second chamber are delimited by the first partition and the container outer wall, and the second chamber and the third chamber are delimited by the second partition and the container outer wall. The first and second partitions adjoin the container outer wall along the longitudinal extent, and the first, second and third chambers are arranged adjacent to one another along the longitudinal extent. It is also possible to have more than two partitions and/or more than three chambers.

The first chamber can be delimited by means of the partition and a first part of the container outer wall extending substantially along the longitudinal extent—namely, a first outer longitudinal side of the wall—and the second chamber can be delimited by means of the partition and a second part of the container outer wall extending substantially along the longitudinal extent—namely, a second outer longitudinal side. The partition can be connected to a third and a fourth part of the container outer wall extending substantially along the longitudinal extent—namely, the upper side and the lower side.

The partition preferably has a passage to form a pneumatic link between the first and second chambers within the drying container. A pneumatic link between the first and second chambers can be used to route a compressed air flow in opposite directions and along the longitudinal extent in the first and the second chamber and transversely to the longitudinal extent in the pneumatic link; that is, to route it substantially in a U shape in the drying container. In respect of the container outer wall, the flow path is therefore relatively well designed and a through-flow of compressed air fills the internal space of the drying container in an improved manner. The U-shaped routing of the flow leads to improved usage of the drying space over a relatively large area but a low through-flow depth along the longitudinal extent of the drying container and nevertheless an extended length of drying bed since the length of the drying container enters twice into the length of the drying bed. In particular, "dead angles", in which there is no flow or only weak flow, or regions that are not used for drying are largely avoided; virtually the entire internal space of the drying container can be used to dry the compressed air flow. This is achieved in a particularly advantageous manner in the case where the drying granules can be accommodated directly in the first and second chambers. This can be used to achieve improved usage of the drying granules and/or to reduce the volume of drying granules without any loss of drying performance.

In one embodiment, the first and second chambers are used to directly accommodate drying granules, that is, in particular, without the need for an additional container insert or a cartridge. In this embodiment, the drying granules can be introduced without an additional container insert directly into the first and second chambers, advantageously, also into a pneumatic link between the first and second chambers.

Longitudinal routing of the compressed air flow in the drying container is a preferred approach. In such approach, the compressed air flow can be routed in opposite directions in a first and a second chamber as well as along the longitudinal extent; and, in particular, can be routed approximately in a U shape.

In one embodiment, the partition extends on a substantially central longitudinal axis of the drying container, which follows the longitudinal extent. The longitudinal axis of the drying container is central with respect to a container outer wall, at least in one cross section of the drying container. In particular, the partition is positioned in the center between a first outer longitudinal side of the container outer wall and a second outer longitudinal side of the container outer wall in at least one cross section of the drying container. Desirably, the first and second chambers have substantially identical chamber internal volumes. This embodiment is particularly compact and limited in terms of pressure losses while nevertheless providing an extended dryer bed and, to this extent, improved drying.

A first chamber axis of the first chamber and a second chamber axis of the second chamber are preferably arranged so as to extend adjacent to and substantially parallel to the partition of the drying container. Chamber alignment, which is identical in this respect, leads to a particularly compact drying container with limited pressure loss. In particular, it is advantageous to arrange a first chamber axis and a second chamber axis at equal distances from the partition. It is also advantageous for the first and second chambers to have an identical clear cross section of a flow path for the compressed air flow. Indeed, it is desirable that the first and second chambers have a largely identical geometrical shape and dimensioning. For example, the first and second chambers can each be formed as a single-flow tube. Preferably, the clear cross section of the first and/or of the second chamber has a circular or elliptical clear cross section.

It should be appreciated that the inventive drying container offers the basis for a space-saving adaptation of the shape thereof to installation space requirements, e.g., a drying container can be well adapted to the structural shape of a motor and a compressor of a compressed air supply unit. A drying container having an internal volume divided between a first and a second chamber is more easily adapted to an environment in terms of its external dimensions—while nevertheless ensuring pressure resistance—than a drying container having a single chamber and the same internal volume. The first and second chambers can advantageously be formed in the same direction and with substantially the same shape, for example; example e.g., they can each be cylindrical with a circular or elliptical cross section. The cross-sectional diameters of the first and second chambers can be arranged along a straight line containing the cross-sectional diameter; in one embodiment, the cross-sectional diameters of the first and second chambers can be arranged on different angle legs angled relative to one another. In another embodiment, the first and second chambers can be of substantially identical shape but aligned differently along chamber axes angled or oblique relative to one another. In yet another embodiment, the first and second chambers can also have different shapes.

It is preferable if the first chamber has a first clear cross section and the second chamber has a second clear cross section of a flow path for the compressed air flow, wherein the first clear cross section and the second clear cross section are of equal size along the longitudinal extent; in particular, the first and second chambers have a largely identical geometrical shape and dimensioning. The clear cross sections can be designed to be relatively small, advantageously leading to less expenditure of material. In another embodiment, the first chamber can have a first clear cross section and the second chamber can have a second clear cross section of a flow path for the compressed air flow, wherein the first clear cross section and/or the second clear cross section vary along the longitudinal extent, in particular vary in shape and/or size.

In one embodiment, the internal space of the drying container is divided by one partition into two chambers, namely, the first chamber and the second chamber. The first and second chambers together have a particularly suitable, approximately 8-shaped flow cross section for a compressed air flow at the inlet of the drying container; this flow cross section can be sealed off in an improved manner, e.g., by means of a shaped seal. The temperature conditions in the compressed air flow are evened out in a preferred manner; or, if required, precooling of inflow air can be implemented in an improved manner.

As a preferred option, the first chamber and the second chamber are formed integrally with the container outer wall and the partition of the drying container. Integral formation with the container outer wall and the partition of the drying container increases the stability of the drying container. A cartridge or similar additional container to accommodate drying granules is not required; the drying granules can be introduced directly into the drying container. This reduces the number of parts and improves the pressure holding capacity. This applies in respect of the operating pressure and/or bursting pressure. Given an identical pressure requirement, the design with a first and a second chamber means that a wall thickness of the drying container can be kept relatively small in comparison with a drying container having just one chamber and can be reduced, or at least not increased. An inventive drying container can be designed for an operating pressure of up to 30 even 40 bar. A bursting pressure of a drying container is preferably 1.5 times, and can be 2.5 times, the level of the operating pressure. The wall thickness is preferably less than 4 mm, ideally, less than 3.5 mm. The drying container can be embodied with a wall thickness in a range of 3 mm or less, if appropriate, it being possible to achieve an operating pressure of up to 30 bar and a bursting pressure of 2.5 times the operating pressure. By virtue of the shape of the drying container, the sealing of the container can also be designed for a higher operating pressure. The increased bursting pressure limit leads to higher operating safety. A drying container of this kind is therefore suited as a preferred option for the implementation of a compressed air supply unit on a vehicle such as a passenger car, in particular an SUV, for which relatively high operating pressures are desired.

In the context of a pneumatic circuit implementation of the compressed air supply unit, the first and second chambers are preferably pneumatically linked in series in the main pneumatic line to form a first and a second air dryer stage of the air dryer arrangement. In particular, the first and the second air dryer stage are pneumatically linked by just one pneumatic link within the drying container to guide the compressed air flow. This leads to a compact design and increases the operating pressure resistance of the drying container. By way of example, the pneumatic link between the first and second chambers can be formed by means of a passage in the partition. Advantageously, this means that the air can flow through the first chamber initially along a longitudinal first chamber axis, then through the pneumatic link and, after this, through the second chamber, along the second chamber, in the opposite direction along the longitudinal second chamber axis. This has the effect that the first and second chambers communicate pneumatically and are pneumatically linked to form a U-shaped flow path for the compressed air flow.

Preferably, the container outer wall of the drying container has a pneumatic intermediate connection, which is preferably arranged at the same longitudinal position along a longitudinal extent of the drying container as the pneumatic link (e.g., a passage in a partition). The pneumatic link and the intermediate connection are preferably formed in combination as part of a transverse core that widens the container outer wall of the drying container along a link plane relative to a connection side of the drying container. The pneumatic intermediate connection can be sealed with respect to pressure. In particular, the pneumatic intermediate connection can be designed for connection of a pneumatic element. A "pneumatic" feature (e.g., a pneumatic element) is to be understood to be a feature (element) suitable for carrying compressed air; for example, a pneumatic link is a link suitable for carrying the compressed air flow, such as a pneumatic line or a passage suitable for carrying the compressed air flow or a similar "pneumatic" feature. A pneumatic link having a pneumatic element is a pneumatic link that goes beyond a simple pneumatic link between the first and second partial lines and has expanded pneumatic functionality for influencing the compressed air flow by virtue of the (pneumatic) element suitable for carrying compressed air. In particular, the pneumatic element can be implemented as a pneumatic intermediate connection—additionally or alternatively—in the form of a restrictor, a nozzle, in the form of a valve or similar pneumatic element. For example, the pneumatic element can be a restrictor or a water trap or the like of a pneumatic element through which the compressed air flow can flow. An additional compressed air connection can be arranged at the level of a passage, formed by the first and the second chamber, in the partition.

In one embodiment, a first and a second connection of the main pneumatic line are formed on a connection side of the drying container, wherein the first connection is formed so as to lead to the first chamber and the second connection is formed so as to lead to the second chamber. In this way, the air dryer arrangement can be replaced in a modular and simple manner and can be attached to the other parts of the compressed air supply unit in a simply assembled manner during production. As a preferred option, the first and second connections of the main pneumatic line are formed on a drying container connection side lying opposite the pneumatic link.

In one embodiment, a connection side of the drying container has a connection flange common to the first chamber and the second chamber. This flange can be designed especially for high operating pressures. The connection flange preferably has a first opening associated with the first chamber and a second opening associated with the second chamber. The connection flange is thus designed for the drying container. The first opening and the second opening are preferably separated by a flange web associated with the partition.

In one embodiment of the compressed air supply unit, in the connected air dryer arrangement, a first connection of the main pneumatic line can be switched to the first chamber and to a compressed air feed and/or a vent connection by means of the valve arrangement on a connection side of the drying container. Switching to a compressed air feed can be in the context of a filling mode or a filling-boost mode for example. Switching to a vent connection can be in the context of an operating mode of a venting operation.

As an option, a second connection can be switched to the second chamber and to a compressed air connection leading to the pneumatic unit by means of the valve arrangement on a connection side of the drying container, for example, in the context of an operational filling mode.

A connection side of the drying container preferably lies opposite a connection plane between the valve arrangement and an air compressor. These are separated from one another by a connection spacing. Advantageously, the connection side and the connection plane can be spaced apart by means of the air compressor. A segment of the main pneumatic line between the connection side of the drying container and the valve arrangement can extend in the connection plane. This leads to particularly space-saving accommodation of the main pneumatic line and to easy assembly of the compressed air supply unit.

A motor and an air compressor can be provided, wherein the motor and the air compressor are formed as a constructional unit with the main pneumatic line and the air dryer arrangement and with the valve arrangement. The motor of the air compressor and the air dryer arrangement can thus be made available on one side of the connection plane, and the valve arrangement can be made available on another side of the connection plane, and they can then be assembled in a modular manner in the connection plane. An interface embodiment in the connection plane has the effect that, during assembly, the segment of the main pneumatic line between the drying container and the valve arrangement is formed in the connection plane. For this purpose, it is possible, for example, for a suitable shaped seal or the like to be provided in the connection plane for the segment of the main pneumatic line. By means of the modular construction, it is possible to specify different versions of air dryer arrangements, in particular with drying containers adapted to the installation space, with one version of a basic embodiment of a compressed air supply unit—comprising a motor, an air compressor and a valve arrangement. In this way, a larger number of adapted variants of a compressed air supply unit can be made available without an excessive increase in the number of components. There is an optimization of assembly during production and cost and weight advantages as a result.

In one embodiment, a constructional unit capable of modular assembly is provided for the compressed air supply unit, the constructional unit having: the air dryer arrangement and the valve arrangement, a motor and an air compressor, in particular a two-stage air compressor, wherein the motor and the air compressor are formed in the constructional unit by at least part of the main pneumatic line, and wherein the motor and the air dryer arrangement, on the one hand, and the valve arrangement, on the other hand, of the air compressor can be assembled in a modular fashion so as to form the part of the main pneumatic line in the connection plane between the drying container and the valve arrangement.

The modular construction allows separation of the dryer function at the drying container, on the one hand, and the control and air distribution function in the valve arrangement or the connection plane, on the other hand. It is advantageous if, in the valve arrangement, the control piston and magnetometer axes of the valves are aligned parallel to the connection plane, i.e., to the air distribution plane. In addition to functional advantages, this also has the advantage that the control and dryer functions no longer determine the width of the overall assembly of the compressed air supply unit; on the contrary, this can be of relatively shallow design capable of being fastened on both sides to the vehicle.

The abovementioned specific modular construction also has the advantage that the valve arrangement is close to the air compressor, i.e., the air distribution function is arranged in the warm region of the air compressor. Waste heat from the latter thus also supports reliable operation of the valve arrangement at very low outside temperatures of, for example, down to −40° C.

In particular, the constructional unit is formed by a housing arrangement which, on the one hand, has a valve arrangement and, on the other hand, has an air compressor, a motor and the drying container, which has a first chamber axis and a second chamber axis and a connection side, which is spaced apart from a connection plane of the valve arrangement by means of a connection spacing. The air compressor is preferably arranged in the connection spacing between the connection side and the connection plane, and the motor extends parallel to the first and second chamber axes of the drying container and opposite the valve arrangement. The monoblock of the air compressor advantageously allows a reliable and stable attachment of the functional groups comprising the valve arrangement, the drying container and the motor.

In other words, the constructional unit comprising the air compressor, the motor and the drying container can form an approximately U-shaped housing arrangement having a first and second leg and a base. With this approximately U-shaped housing arrangement, the motor extends along the first leg and the drying container extends along the second leg and the air compressor extends along the base. Furthermore, the valve arrangement can be arranged on a side of the base opposite the legs. To this extent, the connection plane extends substantially along the base. This arrangement is of particularly compact and simple construction and is easy to assemble. Moreover, the individual components of the constructional unit—i.e., the air compressor, the motor, the drying container and the valve arrangement—can be designed, manufactured or purchased separately according to requirements and can be supplemented or replaced in a modular fashion.

In the context of a U-shaped housing arrangement, a double-cylindrical form of the drying container can also be well adapted to a cylindrical motor construction; in particular, the cross sections of the first chamber and of the second chamber can be arranged at an angle to one another in order as far as possible to follow an external contour of the motor with the external contour of the drying container. Moreover, interspaces can be used for connections or other components.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is discussed in greater detail below with reference to the accompanying drawings, in which.

LIST OF REFERENCE CHARACTERS 0 air feed, intake
0.1 air filter
0.3 further filter
1 compressed air feed
2 compressed air connection
3 vent connection
3.1 vent filter
4 accumulator connection
100 air dryer arrangement
101 first air dryer stage
102 second air dryer stage
110 first opening
120 second opening
130 connection flange
131 flange web
131.1 tongue
131.2 groove
140 drying container
150 partition
150.1 first partition end
150.2 second partition end
150.3 partition continuation
150.4 partition section
151 first chamber
152 second chamber
153 pneumatic link
154 internal space
155 passage
160 pressure plate arrangement
161, 162 first and second pressure plate
163, 164 compression spring
170 container outer wall
171, 172 head side
173 outer longitudinal side
174 second outer longitudinal side
175 upper side
176 lower side
177 8-shaped connection surface
178 closure element
178.1, 178.2, 178.3 lugs
179 tubular extension
180 intermediate connection
180' intermediate connection
181, 181' closure
200 main pneumatic line
201 first part of the main pneumatic line
202 second part of the main pneumatic line
203 third part of the main pneumatic line
204 fourth part of the main pneumatic line
210 first connection
220 second connection
230 branch line
240 vent line
250 pneumatic control line
251 line segment
260 further vent line
261 branch connection
300 valve arrangement
310 directional valve arrangement
311 check valve
312 vent valve
313 pressure limitation
314 control piston
314.1 relay vent element
314.2 double relay piston
314.2 relay reset element
315 adjustable spring
320 control valve, solenoid valve
321 control line
322 coil
331 first restrictor
332 second restrictor
400 air compressor
401 first compressor region
402 second compressor region
403 compressor stage
500 motor
600 pneumatic line
601, 602, 603, 604 spring branch line
605 accumulator branch line
610 gallery
1000 compressed air supply unit
1001 pneumatic unit 1002, 1002' pneumatic element, water trap
1003 compressed air supply system
1010 valve block
1011, 1012, 1013, 1014 bellows
1111 to 1114 solenoid valve
1015 accumulator
A connection spacing
A1 connection plane
A2 connection side
D1, D2 spacing
DL compressed air, compressed air flow
E longitudinal extent
G housing arrangement
G1, G2, G3 housing sections
K1, K2 first and second chamber axis
L air
M longitudinal axis
Q1, Q2 cross section of the flow path
R1, R2 flow direction
S1 first leg
S2 second leg
B base
T drying granules
V vertical extent of partition

DETAILED DESCRIPTION OF THE PREFERRED EMBODIMENTS

Figure 1:
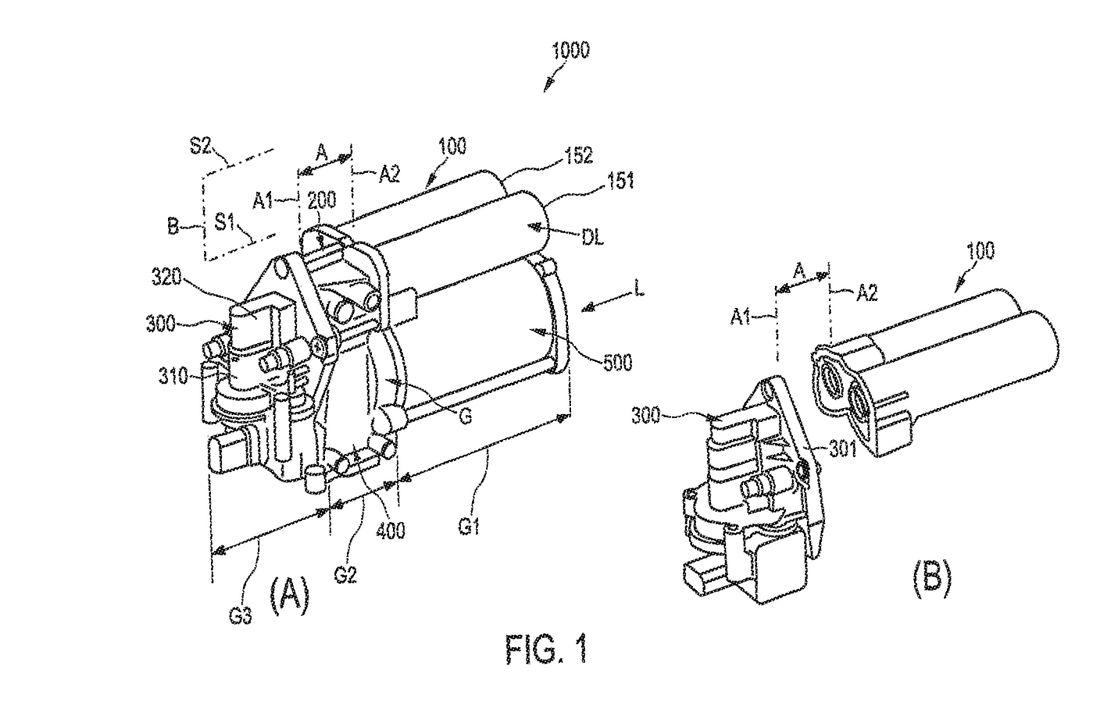
FIGS. 1A and 1B are perspective views of a compressed air supply unit according to an embodiment of the present invention having a housing arrangement including an air dryer arrangement, a motor, an air compressor and a valve arrangement to form a modular constructional unit.

FIG. 1(A) is a perspective view of a compressed air supply unit 1000 designed for supplying a pneumatic unit 1001 (see also FIG. 3) in the form of an air suspension unit of a passenger vehicle. Referring to FIG. 1, the compressed air supply unit 1000 has a motor 500 for driving an air compressor 400 designed as a dual compressor. Air L to be compressed is fed to the air compressor 400 past the motor 500 and, from there, is fed as compressed air to a main pneumatic line 200, which is shown symbolically in FIG. 1 and in greater detail in FIG. 2(A); namely, in particular, being fed initially to a first part 201 of a main pneumatic line 200, the part being shown in FIG. 2(B). Likewise connected to the main pneumatic line 200 is an air dryer arrangement 100, which is used to dry the compressed air DL in a dryer bed (see FIG. 2), which is formed directly in the chambers 151, 152 of the air dryer arrangement 100. As illustrated in greater detail in FIGS. 4 and 5, the main pneumatic line 200 connects a compressed air feed 1 from the air compressor 400 to a compressed air connection 2 to a gallery of the pneumatic unit. A valve arrangement 300 is also pneumatically connected in the main pneumatic line 200—namely adjoining a second part 202 thereof, shown in greater detail in FIG. 2(B), from the air dryer arrangement 100. The valve arrangement 300 has a switchable directional valve arrangement 310, which can be switched by means of a solenoid valve 320.

Overall, the compressed air supply unit 1000 is formed by a motor 500 and a two-stage air compressor 400, which can be assembled in a modular fashion in a constructional unit with the air dryer arrangement 100 and the valve arrangement 300 as well as the main pneumatic line 200. As can be seen in detail in FIG. 1(A), a housing arrangement is made available with the motor 500 and the compressor 400, wherein the compressor 400 serves as a central monoblock. As is shown in FIG. 1(B), the air dryer arrangement 100 and the valve arrangement 300 can be attached on opposite sides to this housing arrangement. In particular, the air dryer arrangement 100 and the valve arrangement 300 can be attached replaceably to the housing arrangement. The housing arrangement G, which is shown in FIG. 1(A) is, on the one hand, of approximately U-shaped construction with the motor 500, the air compressor 400 and the air dryer arrangement 100 and, for this purpose, has a first leg S1, a second leg S2 and a base B. The motor extends along the first leg S1 in housing section G1, the air compressor 400 extends along the base B in housing section G2 and the air dryer arrangement 100 extends along the second leg S2 in housing section G1. In contrast, the valve arrangement 300 is arranged on an opposite side of the base B from the first and second legs S1, S2, in housing section G3. The housing arrangement G has a connection plane A1, which faces the valve arrangement 300 and to which the valve arrangement 300 can be attached in a modular fashion. The housing arrangement G has a connection side A2, which faces the air dryer arrangement 100 and to which the air dryer arrangement 100 can be attached in a modular fashion. The connection plane A1 and the connection side A2 are spaced apart by means of a connection spacing A, wherein the monoblock of the air compressor 400 is very largely accommodated in the connection spacing A.

Owing to the modular arrangement of the abovementioned components—as can be seen especially from FIG. 1(B)—of the air dryer arrangement 100 and of the valve arrangement 300, the functionalities of the dryer function, on the one hand, and of the compressed air control function, on the other hand, are spatially separated. The functionalities can be designed individually to meet the requirements and, if appropriate, can be replaced and changed separately by replacement. The arrangement of the valve arrangement (compressed air control functionality) on the air compressor 400 has the advantage that the end cover and associated fastening and sealing elements for closing an assembly opening on the air compressor can be eliminated as separate elements. On the contrary, they can be implemented as part of a flange of the valve arrangement 300, namely, by the first and second parts 201, 202 of the main pneumatic line 200 being accommodated in the flange 301 of the valve arrangement 300 with a suitable shaped seal. This integration in the monoblock of the valve arrangement 300 and, in a modification, also of the air compressor 400 also leads to a reduction in flow noises and to a reduction in assembly effort. Moreover, the center of gravity of the compressed air supply unit 1000 is formed on the monoblock of the air compressor 400; to this extent, the position of the center of gravity is largely central in the overall assembly and leads to better weight distribution.

The formation of at least part of the main pneumatic line 200 in the connection plane leads to advantageous air distribution both for the air compressor 400 and also for the air dryer arrangement 100. Moreover, air ducts for filling and/or venting the valve arrangement 300 can be branched off from the connection plane A1 and from the connection side A2, respectively. This reduces the number and length of the pneumatic lines.

In particular, the air compressor 400 can be designed as a two-stage air compressor. It is possible, inter alia, for the required pneumatic link of a first compressor stage to a second compressor stage of a two-stage compressor to be accommodated at least partially in the flange 301. The air ducts through the housing of the valve arrangement 300 can be connected in a relatively simple manner to the flange 301 and hence to the pneumatic link between the first and second compressor stages. The flange 301 can also be provided with a cooling function, thus enabling the design configuration of the flange connection of the valve arrangement and the air compressor 400 to be adapted in respect of the compressor function, in particular in respect of a two-stage compressor function.

Owing to the possible routing of a vent path into the monoblock of the air compressor 400 and/or of the motor 500, particularly generous and low-noise relief of the venting volume is possible.

Figure 2:
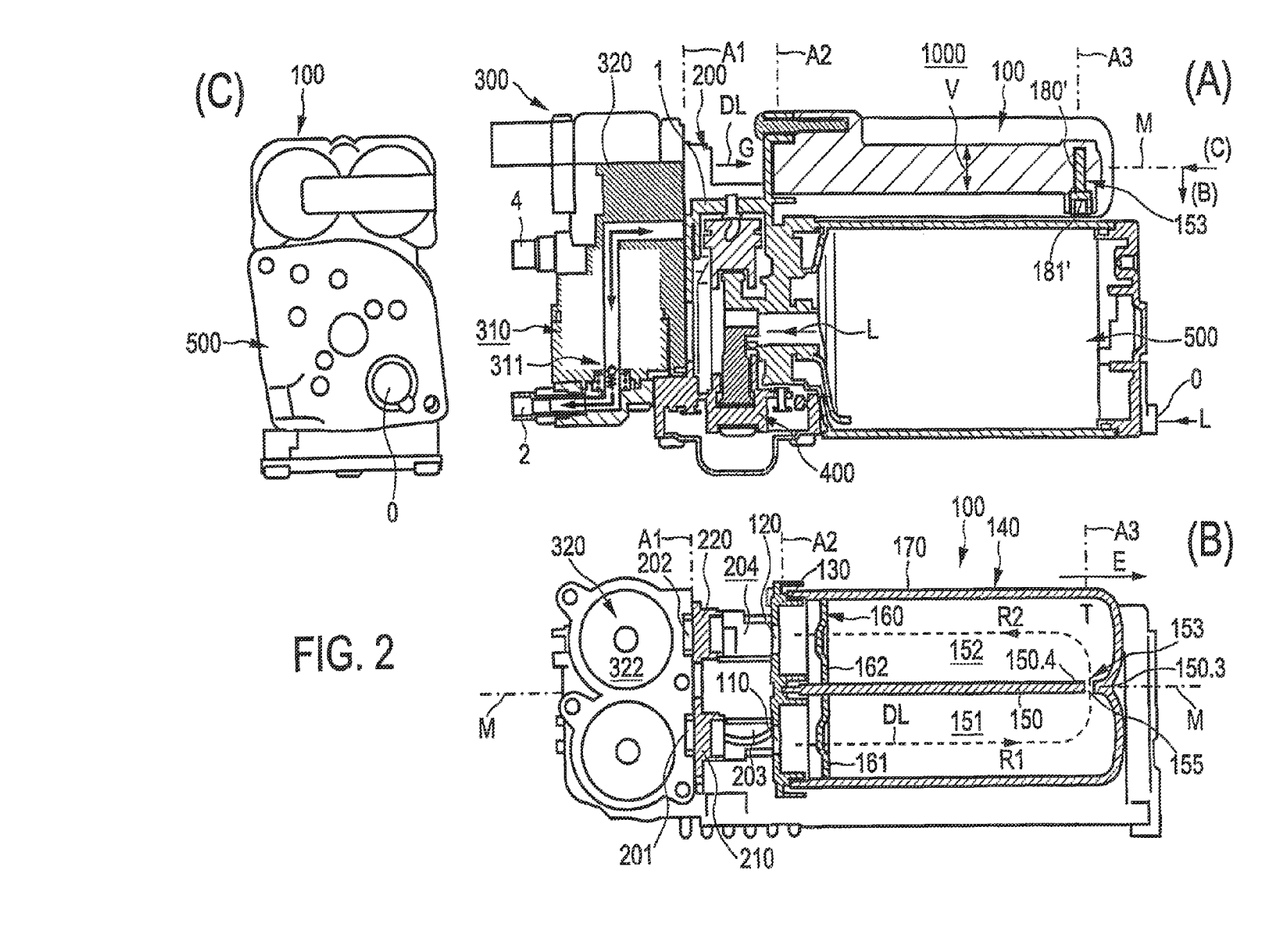
FIGS. 2A, 2B and 2C are various sectional views of the compressed air supply unit of FIG. 1.

FIG. 2 shows the compressed air supply unit 1000 of FIG. 1 in a sectional view (A) from the side, a sectional view (B) from the top and a head view (C).

Figure 4:
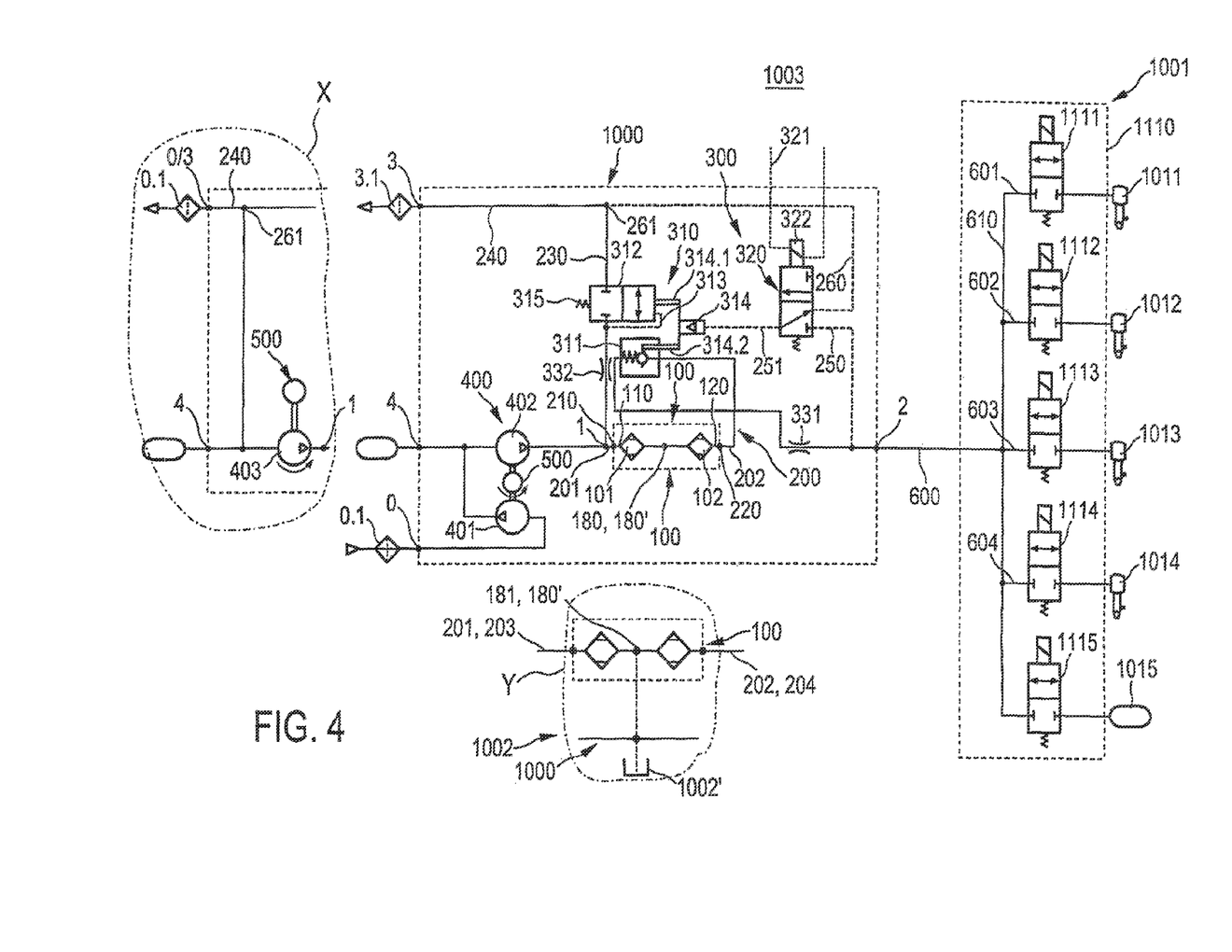
FIG. 4 is a circuit diagram of a compressed air supply unit according to an embodiment of the present invention having a valve arrangement with a pilot-controlled check valve and a vent valve, which can be switched by means of a controllable solenoid valve.
Figure 5:
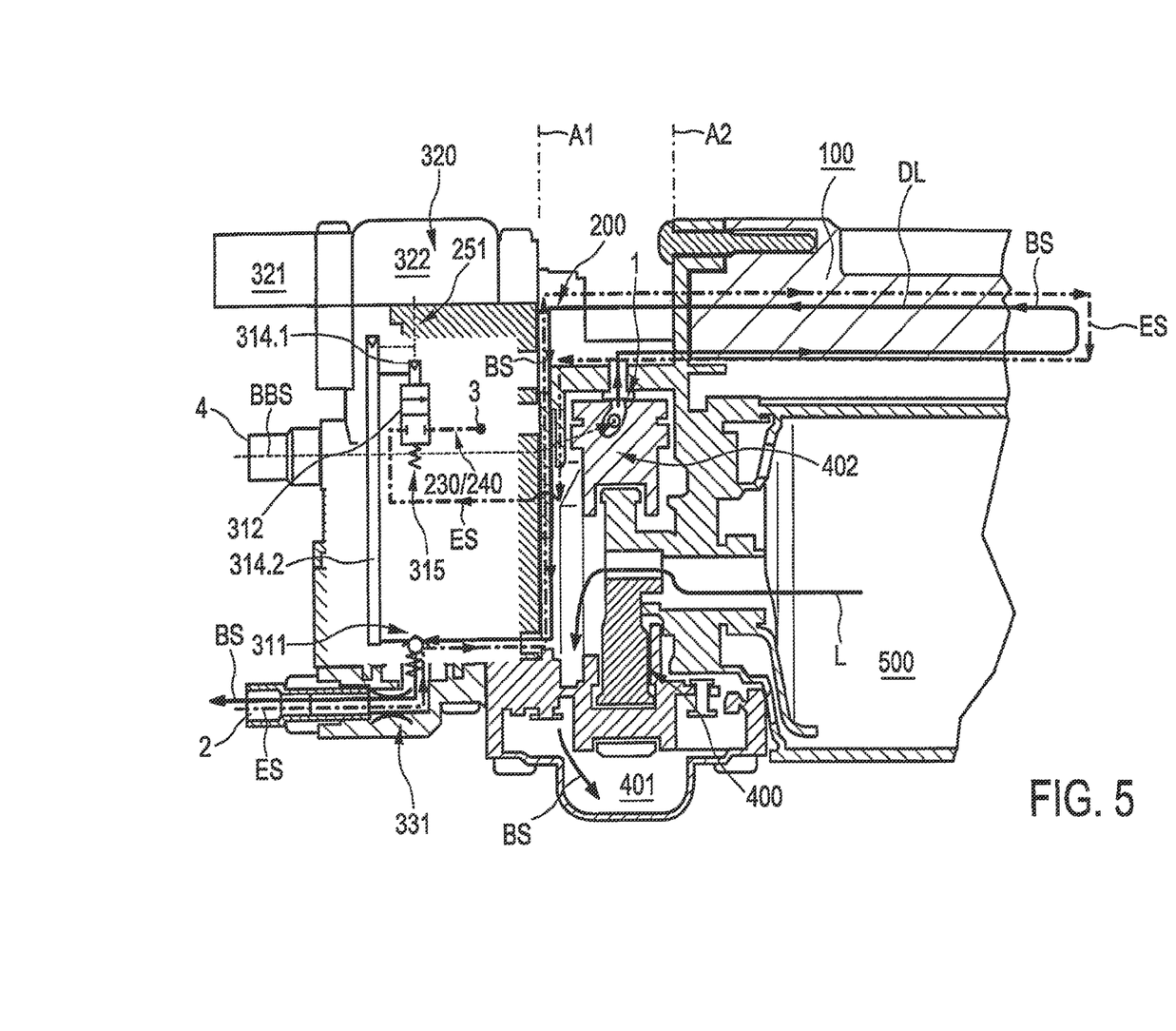
FIG. 5 shows the compressed air supply unit of FIG. 2 with the connection plane between the air compressor and the valve arrangement shown in detail, and illustrates the routing of a compressed air flow during a filling mode (continuous line), a filling-boost mode (dashed line) and a vent mode (chain-dotted line) of the pneumatic unit of FIG. 4.

First, FIG. 2(A) shows that a branch line leading to a vent connection 3, illustrated in greater detail in FIGS. 4 and 5, and an accumulator line leading to an accumulator connection 4 are also connected to the main pneumatic line 200. Via the vent connection 3, the pneumatic unit 1001 can be vented via the main pneumatic line 200 of the air dryer arrangement 100.

As can be seen in FIG. 2(C), air L can be fed to the air compressor 400 through the installation space of the motor 500 via an intake 0. Rapidly available compressed air from an accumulator can also be fed to the main pneumatic line 200 via the accumulator connection 4—and via the line to the compressed air connection 2 leading to the pneumatic unit 1001—without the need to actuate the air compressor 400.

As can also be seen in FIG. 2(A), suitable conduit ducts for the formation of the main pneumatic line 200 are introduced in the connection plane A1 of the housing arrangement G, with the result that—with the closure thereof when the valve arrangement 300 is mounted on the connection plane A1—the main pneumatic line 200 is formed at least in part. Opposite the connection plane A1 between the valve arrangement 300 and the air compressor 200 is a connection side A2 of the air dryer arrangement 100, wherein the connection side A2 of the air dryer arrangement 100 and the connection plane A1 of the housing arrangement G between the air compressor 400 and the valve arrangement 300 are spaced apart approximately by the air compressor 400.

As can furthermore be seen from FIG. 2(B), suitable conduit ducts for the formation of the main pneumatic line 200, namely, the first and second partial lines 201, 202, are introduced in the connection plane A1. Approximately at the connection plane A1, the main pneumatic line 200 has a first connection 210 and a second connection 220. The first connection 210 of the main pneumatic line 200 is formed substantially downstream of the compressed air feed 1 and serves to provide a link with a first opening 110 of a connection flange 130 of the air dryer arrangement 100. The first connection 210 of the main pneumatic line 200 can also be switched to a vent connection 3 or optionally to an accumulator connection 4; this being accomplished by means of the valve arrangement 300. The second connection 220 of the main pneumatic line 200 can be switched to a compressed air connection 2 by means of the valve arrangement 300. On the other hand, the second connection 220 of the main pneumatic line 200 can be linked to a second opening 120 in the connection flange 130 of the air dryer arrangement 100.

In addition to the connection flange 130, the air dryer arrangement 100 has a drying container 140 having a first chamber 151 and a second chamber 152. Specifically, a first and a second connection 210, 220 of the main pneumatic line 200 are routed from a connection plane A1 of the valve arrangement 300 to a connection side A2 of the drying container 140, namely, via the third and fourth parts 203, 204 of the main pneumatic line 200. In this case, the first connection 210 is formed by means of the third part 203 leading to the first chamber 151, next to the second connection 220, by means of the fourth part 2034 leading to the second chamber 152. On the drying container 140, the connection side A2 lies opposite a connection plane A3 having the pneumatic link 153 between the first and second chambers 151, 152.

The drying container 140 is formed by means of a container outer wall 160 and a partition 150, wherein the partition 150 and the container outer wall 160—which can be in one-piece as one container part—of the drying container 140 are formed. The first and second chambers 151, 152 serve to directly accommodate drying granules T, i.e., without the need for a further container insert or a cartridge. The drying granules T can thus be introduced directly into the first and second chambers 151, 152 without a further container insert. The drying granules are held together under contact pressure in the first and second chambers 151, 152 by means of a first and second pressure plate 161, 162. Owing to the one-piece container formation for the drying container 140 comprising the container outer wall 160 and the partition 150, the drying container is designed for a relatively high operating pressure of around 20 bar and possibly up to about 25 bar, wherein the bursting pressure is over twice, approximately 2.5 times, the operating pressure. The relatively high-pressure resistance of the drying container 140 is also assisted, inter alia, by the geometrical shape of the first and second chambers 151, 152, with the result that the wall thickness of the drying container 140 selected can nevertheless be about 3 mm. This embodiment is reliable even for ambient temperatures of 90° C. In this embodiment, the drying container 140 is suitable especially for a passenger car, preferably an SUV. In principle, embodiments for higher operating pressures or bursting pressures that nevertheless still have a reduced wall thickness of less than 3.5 mm for the drying container 140 are also possible. In the present case, the chambers are each formed substantially as a cylindrical tube, wherein their outer walls, which are formed in one piece with the container outer wall 160, come together at the partition 150. The partition 150 thus divides an internal space, delimited by the container outer wall 160, for accommodating the drying granules T into a first and a second chamber 151, 152, this being illustrated in greater detail in FIG. 2.

A compressed air flow DL can be routed initially from the first opening 110, through the perforated pressure plate 161 into the first chamber 151, along a U-shaped path comprising opposed directions R1 and R2, along the longitudinal extent E of the drying container 140. Via a pneumatic link 153 formed by means of a passage 155, the compressed air flow DL enters the second chamber 152 and is then routed in a flow direction R2 in the second chamber 152 opposed to the flow direction R1 in the first chamber 151, and then, once again via a perforated pressure plate 162, to the second opening 120. The compressed air flow DL moves along the longitudinal extent E of the drying container 140 in the opposed directions R1 and R2. As a result, the compressed air flow DL is thus routed backward and forward by means of the main pneumatic line 200—across the spacing between the connection plane A1 and the connection side A2 by means of corresponding conduit sections of the main pneumatic line 200; that is, on the one hand, between the first connection 210 and the first opening 110, and, on the other hand, between the second opening 120 and the second connection 220. The course of the main pneumatic line 200 in the region of the connection plane A1 is shown in FIG. 2(B) by means of corresponding ducts in the housing part of the valve arrangement 300, wherein the ducts also form a first and a second part 201, 202 of the main pneumatic line 200 directly in the connection plane A1. A first part 201 of the main pneumatic line 200 in the connection plane A1 is used to carry the compressed air flow DL from the compressed air feed 1 to the first connection 210. A second part 202 of the main pneumatic line 200 in the connection plane A1 is used to carry the compressed air flow DL from the second connection 220 to the directional valve arrangement 310.

Figure 3:
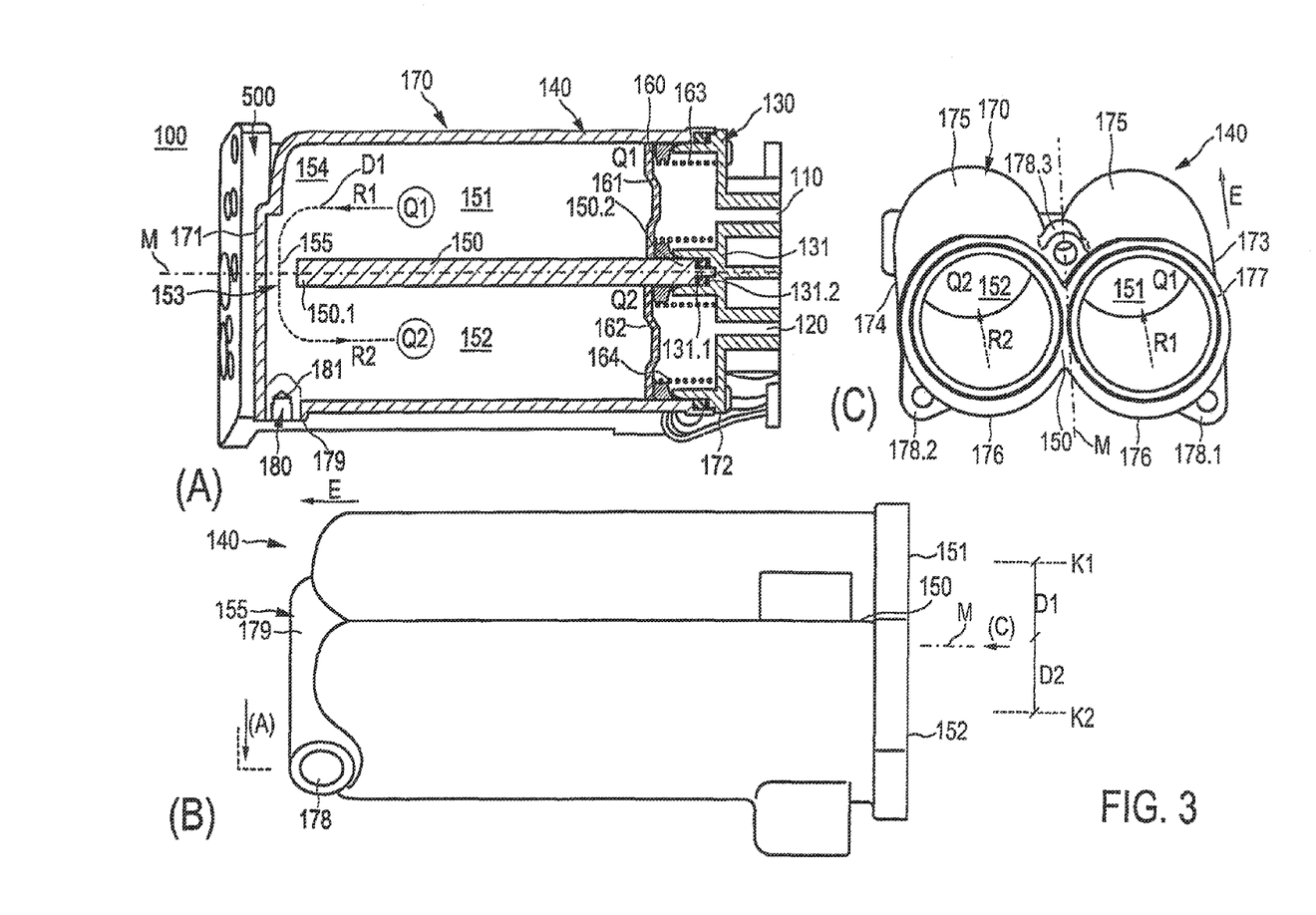
FIGS. 3A, 3B and 3C are perspective views of an air dryer arrangement according to an embodiment of the present invention having a drying container comprising two chambers, this being a modification of the air dryer arrangement in FIG. 2 as regards the pneumatic linkage of the two chambers.

With reference to views (A), (B), and (C) in FIG. 3, the air dryer arrangement 100 is shown with the drying container 140, the connection flange 130 to the main pneumatic line 200 and the pressure plate arrangement 160 with the first and second perforated pressure plates 161, 162 for holding together the drying granules. The first and second pressure plates 161, 162 are each held under contact pressure between the connection flange 130 and the pressure plate arrangement 160 by means of a compression spring 163, 164.

The internal space 154 delimited by the container outer wall 160 is divided by means of a dividing partition 150 into a first and a second chamber 151, 152; the partition 150 ends before a head side 171 of the container outer wall 170 at a first end 150.1, leaving a passage 155 to form the pneumatic link 180, thus allowing the compressed air flow DL to be routed from the first chamber 151 to the second chamber 152—substantially in a U shape by means of a flow reversal, as depicted. The other side 150.2 of the partition 150 is slotted into a groove 131.2 in the connection flange 130 by means of a tongue 131.1. Otherwise, the connection flange 130 is held on the inside of the container outer wall 170 by means of internal stops. The connection flange 130 is thus held circumferentially and held centrally by the second partition end 150.2 on a head side 172 of the container outer wall 170. More specifically, the connection flange 130 has a first opening 110 and a second opening 120 and, between these, is held by the second partition end 150.2 in a groove 131.2 in a flange web 131 associated with the partition 150. For this purpose, the flange web 131 forms a the groove 131.2, in which a tongue 131.1 on the partition end 150.2 of the partition 150 engages. The connection flange 130 in turn is connected to the main pneumatic line 200 in a sealing manner, that is, via the first and second connections 210, 220 of the main pneumatic line 200.

Views (B) and (C) in FIG. 3 furthermore show only the drying container 140. The partition 150 adjoins the container outer wall 170 substantially in one piece along a longitudinal extent E and divides the internal space 154 of the drying container 100 into a first chamber 151 and a second chamber 152. The first and second chambers 151, 152, which are each formed as a cylindrical tube, are arranged adjacent to one another, wherein the first and second chambers 151, 152 are delimited by the partition 150 and the container outer wall 170. Specifically, the first chamber 151 has a first part, extending substantially along the longitudinal extent E, of a boundary, which is formed essentially by a first outer longitudinal side 173 of the container outer wall 170. Laterally, the first chamber 151 is delimited by an inner side of the partition 150, the inner side being located on the same side as the first chamber, and by the first outer longitudinal side 173. The second chamber 152 has a second boundary part, which extends substantially along the longitudinal extent E and is formed by means of a second outer longitudinal side 174 of the container outer wall 170. Laterally, the second chamber is delimited by an inner side of the partition 150, the inner side being on the same side as the second chamber, and by the second outer longitudinal side 174. The first and second chambers 151, 152 are delimited on the upper side by a third boundary part extending substantially along the longitudinal extent E, namely, by an upper side 175 of the container outer wall 170. Both chambers 151, 152 are delimited at the bottom by a corresponding lower side 176 of the container outer wall 170. The partition 150 connects the upper side 175 and the lower side 176 of the container outer wall 170 substantially along the longitudinal extent E. The partition 150 is connected integrally, i.e., in one piece, to the upper side 175 and the lower side 176. In another embodiment, the partition can also be mounted so as to be movable in order to make the spacing between the partition end 150.1 relative to the inner side of the head side 171 of the container outer wall 170—and hence the nominal size of the passage 155—variable, if appropriate by pneumatic actuation. This can be used to form a restrictor of variable nominal size by means of the passage 155 as a pneumatic element in the pneumatic link 153.

Owing to the substantially circular-cylindrical tube form of the first and second chambers 151, 152, the outer circumferential surfaces thereof come together at the partition 150, forming the partition 150, with the result that an approximately 8-shaped connection surface 177 is formed on the head side 172 of the container outer wall 170. Also part of the 8-shaped connection surface 177 are three lugs 178.1, 178.2, 178.3, which are associated with the first and second openings 110, 120 and the partition 150. The lugs are used to fasten the air dryer arrangement 100 on the housing arrangement G of the compressed air supply unit 1000.

Further referring to view (B) in FIG. 3, the first and second chambers 151, 152 in the illustrative embodiment under consideration are designed as single chambers of substantially identical internal volumes, wherein the partition 150 extends on a substantially central longitudinal axis M of the drying container 140, which follows the longitudinal extent E. In particular, a first and second chamber axis K1, K2 are arranged adjacent to and so as to extend substantially parallel to the partition 150 of the drying container, wherein each of the chamber axes K1, K2 is arranged centrally with respect to a chamber 151, 152. A spacing D1 or D2 of the chamber axis K1 with respect to the longitudinal axis M and a second chamber spacing D2 of the second chamber axis K2 with respect to the central longitudinal axis M is the same; that is, in the illustrative embodiment under consideration the two chambers 151, 152 having the same geometrical shape and the same volume are arranged within and also with the same spacing and the same path with respect to the central longitudinal axis M. In particular, a clear cross section of a flow path Q1, Q2, as visible in the form of an opening in the approximately 8-shaped connection surface 177, is formed identically for both chambers 151, 152.

View (B) in FIG. 3 furthermore shows that—at the level of the passage 155, along the longitudinal extent E in the container outer wall 170—an intermediate connection 180 that can be opened is formed. The container outer wall 170 has an opening 178 on the longitudinal side 174, linking the passage 155 and the opening 178 in an approximately tubular extension 179 of the head side 171; this combination of a pneumatic link 153 with the passage 155 and the pneumatic intermediate connection 180 is also referred to as a transverse core. The closure 181 for the intermediate connection 180 is formed by a through bolt and can furthermore be embodied by any other suitable pressure-resistant closure or plug.

Moreover, in a modified embodiment, the pneumatic link 153 can be formed as a simple passage 155 in a partition. The modified embodiment is illustrated in FIG. 2, view (B), from which it can be seen that an intermediate connection 180' with a closure 181' can also be formed in some other way, namely, with slight shortening of the partition 150 in favor of a continuation 150.3 of the partition opposite a partition section 150.4 to form a pneumatic link 153. On a lower side facing the motor 500, the intermediate connection 180' is then formed, following the vertical extent V of the partition—i.e., is virtually integrated into the partition. Whereas, in the modified embodiment, the intermediate connection 180' follows along the vertical extent V of the partition with its approximately tubular pneumatic link 153 to the intermediate connection 180', this has a different relative orientation in the embodiment shown in FIG. 3; i.e., the tubular extension of the intermediate connection 180 in FIG. 3 is aligned transversely to the vertical extent V of the partition 150. In the embodiment in FIG. 3, the compressed air flow DL is routed transversely to the chamber axis K1, K2 in the tubular extension of the pneumatic link 153.

FIG. 4 is a pneumatic circuit diagram of a pneumatic compressed air supply system 1003 having the compressed air supply unit 1000 of the above-described type of a pneumatic unit 1001 in the form of an air suspension unit and, in detail Y, a pneumatic element 1002 in the form of a water trap for connection to an intermediate connection 180 or 180' of the air dryer arrangement 100.

The compressed air supply unit 1000 is used to operate the pneumatic unit 1001. For this purpose, the compressed air supply unit 1000 has a compressed air feed 1 and a compressed air connection 2 to the pneumatic unit 1001. The compressed air feed 1 is formed by means of an air feed 0, an air filter 0.1 arranged ahead of the air feed 0, and an air compressor 400 arranged after the air feed 0 and driven by the motor 500—in this case, a dual air compressor with a first compressor stage 401 and a second compressor stage 402—and by means of a connection of the compressed air feed 1, which is followed in the main pneumatic line 200, namely, by the segments 201, 210, 110 for connection of the drying container 140 and, following these, segments 120, 220, 202.

The first and second chambers 151, 152 of the air dryer arrangement 100 are provided in series in the main pneumatic line 200 to form a first air dryer stage 101 and a second air dryer stage 102 of the air dryer arrangement 100. The first and second air dryer stages 101, 102 are pneumatically linked in the main pneumatic line 200, by means of the passage 155 of the pneumatic link 153, to carry the compressed air flow DL. The pneumatic link is also assigned the intermediate connection 180, 180', which is also shown in FIG. 3. As can be seen from the detail Y in FIG. 4, a pneumatic element 1002, such as a restrictor or a water trap 1002', which is shown here, can be connected to the intermediate connection 180, 180'. In the event that no pneumatic element is connected, the intermediate connection 180, 180' can be closed in a manner sealed against compressed air by means of closure element 178, for example.

In a modification illustrated in the detail X in FIG. 4, the air compressor can be provided in single-stage form by means of a single compressor stage 403 of a piston or by means of a single compressor chamber, wherein the piston can be driven by motor 500. As an alternative, the air feed and a filter element 0.1 arranged ahead thereof are combined with a vent 3.

According to the embodiment shown in FIG. 4, a branch line 230 branches off from the main pneumatic line 200 at the compressed air feed 1 and leads to a vent line 240 leading to the vent connection 3 and to a vent filter 3.1 arranged after the vent. The main pneumatic line 200 is the only pneumatic line of the first pneumatic link, the link continuing as far as the pneumatic unit 1001 with a further pneumatic line 600. The main pneumatic line 200 pneumatically links the compressed air feed 1 and the compressed air connection 2, wherein the air dryer arrangement 100 and, further in the direction of the compressed air connection 2, a pilot-controlled check valve 311 as well as a first restrictor 331 are arranged in the main pneumatic line 200. A first restrictor 331 is arranged between the pneumatically pilot-controlled check valve 311 and the compressed air connection 2. In addition to the pilot-controlled check valve 311, the directional valve arrangement 310 also includes a controllable vent valve 312 in series with a second restrictor 332 in the vent line 230. The series arrangement comprising the first restrictor 331 and the pneumatically pilot-controlled check valve 311 is arranged in the main pneumatic line 200 between the air dryer arrangement 100 and the compressed air connection 2 leading to the pneumatic unit 1001.

The compressed air supply unit 1000 furthermore has the second pneumatic link—namely, vent line 230—which is pneumatically linked to the main pneumatic line 200 and the vent connection 3 and further filter 0.3 and/or muffler. The nominal size of the second restrictor 332 is greater than the nominal size of the first restrictor 331. The vent valve 312 can be formed as a 3/2-way valve that is separate from the pneumatically pilot-controlled check valve 311 and is arranged in the second pneumatic link formed by the vent line 230. As an indirectly switched relay valve, the controllable vent valve 312 is part of a valve arrangement 300 having control valve 320 in the form of a 3/2-way solenoid valve. The control valve 320 can be controlled by means of a control signal in the form of a voltage and/or current signal to the coil 322 of the control valve 320, it being possible for the control signal to be transmitted via a control line 321. When activated, the control valve 320 can be transferred from the normally closed position shown in FIG. 4 into a pneumatically open energized position, in which a control pressure—pressure derived via a pneumatic control line 250 from the main pneumatic line 200 for the purpose of pneumatic control of the controllable vent valve 312 as a relay valve—is transmitted. The controllable vent valve 312 is additionally provided with a pressure limitation feature 313. The pressure limitation feature 313 taps a pressure via a pneumatic control line ahead of the vent valve 312— specifically, between the second restrictor 332 and the vent valve 312—the pressure lifting the piston 314 of the vent valve 312 from the valve seat against the force of an adjustable spring 315—that is, moving the controllable vent valve 312 into the open position even without activation by means of the control valve 320—if a threshold pressure is exceeded. In this way, a situation where an excessive pressure accidentally arises in the pneumatic system 1000 is avoided.

In the current closed state, the control valve 320 isolates the control line 250 and is pneumatically linked via a further vent line 260 to the vent line 240 leading to the vent connection 3. In other words, a line segment 251 of the control line 250 situated between the vent valve 312 and the control valve 320 is linked to the further vent line 260 between the control valve 320 and the vent 3 in the closed position of the control valve 320 shown in FIG. 4. For this purpose, the further vent line 260 is connected at the further branch connection 261 to the vent line 230 and the further vent line 240. These are combined into a segment of a vent line 240 situated between the further branch connection 261 and the vent connection 3.

By means of the control valve 320, the vent valve 312 can be opened by the application of pressure to the piston 314 when there is a control pressure derived from the main pneumatic line 200 or from the further pneumatic line 600 via the pneumatic control line 250. The piston 314 is embodied as a double piston, so that the transfer of the control valve 320 to the open state leads not only to the opening of the vent valve 312 but also to the release of the pilot-controlled check valve 311. In other words, the control valve 320 of the solenoid valve arrangement 300 leads to the activation of the vent valve 312, which is provided separately from the check valve 311, and of the check valve 311. This leads to bilateral pneumatic opening of the air dryer arrangement 100 when the control valve 320 is transferred to the open position. This further operating position that can be assumed by the compressed air supply unit 1000 can be used in operation to vent the pneumatic unit 1001 and, at the same time, to regenerate the air dryer arrangement 100.

The operating position of the compressed air supply unit 1000 shown in FIG. 4 is used primarily for the filling of the pneumatic unit 1001 via the main pneumatic line 200 and the further pneumatic line 600, this involving flow through the check valve 311 in the opening direction.

In this case, the pneumatic unit 1001 in FIG. 4 in the form of an air suspension unit has a number of "bellows" 1011, 1012, 1013, 1014, which are each assigned to one wheel of a passenger vehicle and form a pneumatic spring of the vehicle. Moreover, the air suspension system has an accumulator 1015 for storing rapidly available compressed air for the bellows 1011, 1012, 1013, 1014. Arranged ahead of these bellows 1011 to 1014, in respective spring branch lines 601, 602, 603, 604 branching off from a gallery 610, are respective solenoid valves 1111, 1112, 1113, 1114, which each serve as level control valves for opening or closing a pneumatic spring formed by a bellows 1011 to 1014. The solenoid valves 1111 to 1114 in the spring branch lines 601 to 604 are designed as 2/2-way valves. A solenoid valve 1115 in the form of a further 2/2-way valve is arranged as an accumulator valve ahead of an accumulator 1015 in an accumulator branch line 605. The solenoid valves 1011 to 1015 are connected by means of the spring and accumulator branch lines 601 to 604 and 605, respectively, to a common manifold, namely, gallery 610, and then to the further pneumatic line 600. In this way, the gallery 610 is pneumatically connected to the compressed air connection 2 of the compressed air supply unit 1000 via the pneumatic line 600. The solenoid valves 1111 to 1115 are arranged in a valve block 1010 having five valves. In FIG. 4, the solenoid valves are shown in a de-energized state—in this case, the solenoid valves 1111 to 1115 are formed as normally closed solenoid valves. It should be appreciated that a different arrangement of the solenoid valves can be implemented—it is also possible for fewer solenoid valves to be used as part of the valve block 1010.

To fill the pneumatic unit 1001, the solenoid valves 1111 to 1114 arranged ahead of the bellows 1011 to 1014 and/or the solenoid valve 1115 arranged ahead of the accumulator 1015 are moved into an open position. Nevertheless, an operating position of the pneumatic unit 1001 while decoupled from the compressed air supply unit 1000 is possible in the closed position of the solenoid valves 1111 to 1114 and/or 1115 in the pneumatic unit 1001, owing to the check valve 311 not being released. In other words, cross connection of bellows 1011 to 1015 (e.g., in the off-road mode of a vehicle) filling of the bellows 1011 to 1015 can be performed from the accumulator 1015 or a pressure measurement in the pneumatic unit 1001 can be performed via the gallery 610 without subjecting the compressed air supply unit 1000 to pressure. In particular, the fact that the check valve 311 is closed from the compressed air connection 2 to the compressed air feed 1 and that the control valve 320 is closed means that the air dryer arrangement 100 is protected from being supplied unnecessarily with compressed air. Supplying the air dryer arrangement 100 with compressed air is not advantageous in every operating position of the pneumatic unit 1001. On the contrary, it is advantageous for effective and rapid regeneration of the air dryer unit 100 if this is performed exclusively in the case of venting of the pneumatic unit 1001 from the compressed air connection 2 to the compressed air feed 1; this is then performed with check valve 311 released. For this purpose, the control valve 320 is moved into an open position—as explained above—with the result that both the vent valve 312 is open and the check valve 311 is released. Venting of the pneumatic unit 1001 can take place via the first restrictor 331, the released check valve 311, with regeneration of the air dryer arrangement 100, and then via the second restrictor 332 and the open vent valve 312 to the vent 3.

In other words, for simultaneous released actuation of the check valve 311 and for opening actuation of the vent valve 312, a control piston 314 that can be controlled pneumatically by the control valve 320 is provided as a double relay piston with a relay vent element 314.1 of the vent valve and a relay release element 314.2 for the pilot-controlled check valve 311. The double relay piston illustrates the principle concerned for releasing the check valve 311 and simultaneously actuating the vent valve 312 by means of the two coupled actuating elements—namely, by means of the relay release element 314.2 and the relay vent element 314.1— which can be designed as a one-piece double relay element or, as a modification, as a separate element. In the context of a modification of a design implementation, the actuating elements of the double relay piston can be formed as one-piece regions of a double relay piston.

Different operating positions of the compressed air supply unit 1000 are explained by means of FIG. 5, which is described below, with the flow paths of the compressed air flow DL being illustrated in principle by means of an enlarged detail of FIG. 2(A). To fill a pneumatic unit 1001 at a compressed air connection 2, FIG. 5 shows in a continuous line the routing first of air L from an intake 0, via the installation space of the motor 500, to the compressor 400, which is here embodied with a first compressor stage 401 and in a second compressor stage 402. The air L passes from the first compressor stage 401, via a pneumatic link, situated behind the plane of the drawing, between the compressor stages, into the second compressor stage 402; namely, at the dotted circle symbol. From there, the pre-compressed air is routed via the compressed air feed 1 to the main pneumatic line 200. Via the main pneumatic line 200, the air compressed in this way passes as compressed air DL into the dryer arrangement 100 and is there passed through substantially in a U shape, as described by means of FIG. 1 to FIG. 3. The main pneumatic line 200 continues in the connection plane A1, i.e., in a duct which, in the present case, is formed in the housing of the valve arrangement 300—that is, as indicated in FIG. 2(B) as line segments 201, 202. In the lower region of the valve arrangement 300, the compressed air passes via the pilot-controlled check valve 311 to the compressed air connection 2.

In an alternative way of performing a boost-filling mode, compressed air can be fed directly to the feed, provided with the dotted circle symbol, of the second compressor stage 402 via an accumulator connection 4 in accordance with the chain-dotted line; it can then be fed, in turn, via the compressed air feed 1 to the compressed air connection 2 in the manner described above—i.e., via the air dryer arrangement 100, the main pneumatic line 200 in the connection plane A1 and the check valve 311.

In an opposite case, illustrated by a chain-dotted line, of compressed air routing for venting of the pneumatic unit 1001, compressed air is once again fed to the main pneumatic line 200 in the connection plane A1 via the compressed air connection 2 and via the check valve 311, which is now released by the double relay piston 314.2. In another part of the valve arrangement 300, the vent flow ES passes via the vent line 230 to a further vent line 240 and then to the vent connection 3 with the vent valve 312 open.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A compressed air supply unit for operating a pneumatic unit using a compressed air flow, the compressed air supply unit comprising:
    an air dryer in a main pneumatic line pneumatically linking a compressed air feed from an air compressor and a compressed air connection leading to a pneumatic unit; and
    a valve arrangement pneumatically connected to the main pneumatic line for controlling a compressed air flow;
    wherein the air dryer includes a drying container having a container outer wall, a partition along a longitudinal extent of the drying container dividing an internal space delimited by the container outer wall into a first and a second chamber, the first chamber and the second chamber being delimited by the partition and the container outer wall, the partition adjoining the container outer wall along the longitudinal extent, and the first chamber and the second chamber being arranged adjacent to one another along the longitudinal extent, and
    wherein a connection flange common to the first chamber and the second chamber is disposed on a connection side of the drying container, the connection flange having a first opening associated with the first chamber and a second opening associated with the second chamber, the first opening and the second opening being separated by a flange web associated with the partition.

2. The compressed air supply unit as claimed in claim 1, further comprising a pneumatic link linking the first chamber to the second chamber, and wherein the compressed air flow in the first chamber and the second chamber is routable (i) in opposite directions and along the longitudinal extent and (ii) transversely to the longitudinal extent in the pneumatic link.

3. The compressed air supply unit as claimed in claim 1, wherein the partition extends along the longitudinal extent and substantially centrally on a longitudinal axis of the drying container, and wherein the first and second chambers have substantially identical chamber volumes.

4. The compressed air supply unit as claimed in claim 1, wherein a first chamber axis of the first chamber and a second chamber axis of the second chamber extend adjacent to and substantially parallel to the partition.

5. The compressed air supply unit as claimed in claim 1, wherein the partition divides the internal space of the drying container just the first chamber and the second chamber, and wherein a first chamber axis of the first chamber and a second chamber axis of the second chamber are substantially equidistant from the partition.

6. The compressed air supply unit as claimed in claim 1, wherein the first chamber has a first clear cross section and the second chamber has a second clear cross section of a flow path for the compressed air flow, the first clear cross section and the second clear cross section being of substantially equal size along the longitudinal extent.

7. The compressed air supply unit as claimed in claim 1, wherein the first chamber has a first clear cross section and the second chamber has a second clear cross section of a flow path for the compressed air flow, at least one of the first clear cross section and the second clear cross section varying in at least one of shape and size along the longitudinal extent.

8. The compressed air supply unit as claimed in claim 1, wherein the drying container has a wall thickness of less than about 4 mm, for an operating pressure of up to about 40 bar.

9. The compressed air supply unit as claimed in claim 1, further comprising a first and a second connection of the main pneumatic line from a connection plane of the valve arrangement to a connection side of the drying container, the first connection leading to the first chamber and adjacent to the second connection leading to the second chamber, and, at the drying container, the connection side being disposed opposite a link plane having a pneumatic link between the first and second chambers.

10. The compressed air supply unit as claimed in claim 1, wherein a connection side of the drying container is spaced apart from a connection plane of the valve arrangement by a connection spacing, and a first connection of the main pneumatic line to a side of the connection side is routed to the first chamber, and the first chamber is connected to at least one of the compressed air feed and a vent connection.

11. The compressed air supply unit as claimed in claim 1, wherein a connection side of the drying container is spaced apart from a connection plane of the valve arrangement by a connection spacing, and a second connection of the main pneumatic line is switchable to the compressed air connection leading to the pneumatic unit by the valve arrangement on a side of the connection plane and is switchable to the second chamber via the connection spacing.

12. The compressed air supply unit as claimed in claim 1, wherein a connection side of the drying container is spaced apart from a connection plane of the valve arrangement by a connection spacing, and the air compressor is arranged at least partially in the connection spacing between the valve arrangement and the drying container, and wherein at least a part of the main pneumatic line extends in the connection plane between the drying container and the valve arrangement.

13. The compressed air supply unit as claimed in claim 1, further comprising a modularly assemblable constructional unit, the constructional unit including the air dryer and the valve arrangement, a motor and the air compressor, the motor and the air compressor being formed in the constructional unit by at least a part of the main pneumatic line, and wherein (i) the motor and the air dryer and (ii) the valve arrangement of the air compressor are modularly assemblable to form at least one part of the main pneumatic line in a connection plane between the drying container and the valve arrangement.

14. The compressed air supply unit as claimed in claim 13, wherein the constructional unit has a housing configured to house the valve arrangement, the air compressor, the motor and the drying container, the drying container having a first chamber having a first chamber axis, a second chamber having a second chamber axis, and a connection side spaced apart from the connection plane by a connection spacing, and wherein the air compressor is arranged in the connection spacing between the connection side and the connection plane, and the motor extends substantially parallel to the first and second chamber axes and opposite the valve arrangement.

15. A compressed air supply system, comprising a pneumatic unit and the compressed air supply unit as claimed in claim 1.

16. A vehicle, comprising a pneumatic unit and the compressed air supply unit as claimed in claim 1.

17. The compressed air supply system as claimed in claim 15, wherein the pneumatic unit is a vehicle air suspension unit.

18. The compressed air supply unit as claimed in claim 1, wherein the first chamber and the second chamber are formed in one piece with the container outer wall and the partition of the drying container, and wherein drying granules are accommodated in the first chamber and in the second chamber and in a passage between the first and second chambers.

19. The compressed air supply unit as claimed in claim 1, wherein the drying container has a wall thickness of less than about 3.5 mm for an operating pressure of up to about 30 bar.

20. The compressed air supply unit as claimed in claim 1, wherein the drying container has a wall thickness of less than about 4 mm for a bursting pressure of at least 1.5 times the operating pressure.

21. The compressed air supply unit as claimed in claim 1, wherein the drying container has a wall thickness of less than about 3.5 mm for a bursting pressure of at least 2.5 times the operating pressure.

22. The compressed air supply unit as claimed in claim 13, wherein the air compressor is a two-stage air compressor.

* * * * *